cx(12) United States Patent
Shavit et al.

(10) Patent No.: US 7,904,668 B2
(45) Date of Patent: Mar. 8, 2011

(54) OPTIMISTIC SEMI-STATIC TRANSACTIONAL MEMORY IMPLEMENTATIONS

(75) Inventors: Nir N. Shavit, Cambridge, MA (US); David Dice, Foxboro, MA (US)

(73) Assignee: Oracle America, Inc., Redwood City, CA (US)

( * ) Notice: Subject to any disclaimer, the term of this patent is extended or adjusted under 35 U.S.C. 154(b) by 540 days.

(21) Appl. No.: 11/967,395

(22) Filed: Dec. 31, 2007

(65) Prior Publication Data

US 2009/0172327 A1    Jul. 2, 2009

(51) Int. Cl.
    *G06F 12/14* (2006.01)
(52) U.S. Cl. .................. 711/152; 711/163; 711/E12.093
(58) Field of Classification Search .................. None
    See application file for complete search history.

(56) References Cited

U.S. PATENT DOCUMENTS

| | | | |
|---|---|---|---|
| 6,938,130 B2 | 8/2005 | Jacobson et al. | |
| 7,206,903 B1 | 4/2007 | Moir et al. | |
| 7,269,693 B2 | 9/2007 | Tremblay et al. | |
| 7,269,694 B2 | 9/2007 | Tremblay et al. | |
| 7,269,717 B2 | 9/2007 | Tremblay et al. | |
| 7,669,015 B2 * | 2/2010 | Dice et al. | 711/152 |
| 2007/0162520 A1 | 7/2007 | Petersen et al. | |
| 2007/0198519 A1 * | 8/2007 | Dice et al. | 707/8 |
| 2007/0240158 A1 | 10/2007 | Chaudhry et al. | |
| 2007/0260608 A1 | 11/2007 | Hertzberg et al. | |
| 2007/0260942 A1 | 11/2007 | Rajwar et al. | |
| 2007/0282838 A1 | 12/2007 | Shavit et al. | |
| 2007/0288587 A1 | 12/2007 | Aguilera et al. | |
| 2007/0288900 A1 | 12/2007 | Lev et al. | |
| 2007/0300238 A1 | 12/2007 | Kontothanassis et al. | |

* cited by examiner

*Primary Examiner* — Kevin Verbrugge
(74) *Attorney, Agent, or Firm* — Robert C. Kowert; Meyertons, Hood, Kivlin, Kowert & Goetzel, P.C.

(57) ABSTRACT

A lock-based software transactional memory (STM) implementation may determine whether a transaction's write-set is static (e.g., known in advance not to change). If so, and if the read-set is not static, the STM implementation may execute, or attempt to execute, the transaction as a semi-static transaction. A semi-static transaction may involve obtaining, possibly after incrementing, a reference version value against which to subsequently validate that memory locations, such as read-set locations, have not been modified concurrently with the semi-static transaction. The read-set locations may be validated while locks are held for the locations to be written (e.g., the write-set locations). After committing the modifications to the write-set locations and as part of releasing the locks, versioned write-locks associated with the write-set locations may be updated to reflect the previously obtained, or newly incremented, reference version value.

18 Claims, 10 Drawing Sheets

OPTIMISTIC SEMI-STATIC TRANSACTIONAL MEMORY IMPLEMENTATIONS

BACKGROUND OF THE INVENTION

1. Field of the Invention

The present invention is directed to computer systems. More particularly, it is directed to coordination mechanisms for concurrent programming in computer systems.

2. Description of the Related Art

A traditional goal of multi-processor software design has been to introduce parallelism into software applications by allowing operations to proceed concurrently if they do not conflict with each other when accessing memory. For instance, mutual exclusion locks and monitors represent two traditional concurrent programming synchronization mechanism that may protect shared resources by separating accesses to them in time. As long as a given thread retails a lock on an object or resource, no other thread may modify the object and any other thread attempting to modify the object may be blocked from further execution until the lock is released.

Traditional locking techniques are known to suffer from several limitations however, For example, coarsely grained locking schemes may protect relatively large amounts of data, but may decrease performance due to limited parallelism. Coarsely grained locking schemes are generally not scalable either. Threads may block each other from accessing a single, large, block of memory even if they do not access the same addresses. Conversely, finely grained locked schemes, such as those employing lock-based concurrent data structures, may perform well (e.g., prevent unnecessary blocking), but that performance may be offset by increased programming complexity and increased risk of deadlock.

Concurrent software designs generally try to ensure that threads do not observe partial results of an operation concurrently executed by other threads. Frequently, locks are used to prevent one thread from accessing the data affected by an ongoing operation performed by other threads. Such locking may involve a "balanced" locking scheme that maintains correctness without restricting access to unnecessarily large amounts of unrelated data, such as by using too large of a locking granularity and thereby potentially causing other threads to wait. Preventing deadlock (e.g., causing software to freeze up) is also generally a goal of locking schemes. Furthermore, concurrent software designs frequently have to contend with delays caused by issued unrelated to blocking. For example, a thread holding a lock may be preempted or perform expensive input/output (110) operations, thereby potentially causing an overall reduction in throughput.

Transactional memory (TM) may be considered a paradigm that allows a programmer to design code as if multiple locations can be accessed and/or modified in a single, atomic step (e.g., whether or not they are contiguous in memory). As typically defined, a transactional memory interface may allow a programmer to designate certain sequences of operations as "atomic" blocks, which may be guaranteed by the transactional memory implementation to either take effect atomically and in their entirety (e.g., the succeed) or have no externally visible effect (e.g., they fail). Thus, with transactional memory, it may be possible to complete multiple operations with no possibility of another thread observing the partial results.

In general, in transactional memory implementations the concurrent execution of different atomic blocks by different threads does not appear to be interleaved. To execute an atomic block, according to a transactional paradigm, the underlying system may begin a transaction, execute the atomic block's memory accesses using that transaction and then attempt to commit the transaction (e.g., make the memory modifications visible to other threads). If the transaction commits successfully, the atomic block's execution appears to take effect atomically at the transaction's commit point. If the transaction fails, the atomic block does not seem to take effect at all and memory may appear as if the atomic block had not been executed at all. It is generally considered the responsibility of the TM implementation to guarantee the atomicity of operations executed by transactions.

TM may, in general, be implemented in hardware or software. For instance, TM may be implemented using special hardware support (e.g., by enhancing existing hardware memory management mechanisms to support atomic, programmer-specified, transactions) and/or using software-only techniques (e.g., using extensions to conventional programming languages). A hardware transactional memory (HTM) implementation may directly ensure that a transaction is atomic, while a software transactional memory (STM) implementation may provide the illusion of atomicity (e.g., the transaction appears atomic to other, concurrently executing, threads), even if actually executed in multiple, smaller, atomic steps by the underlying hardware. In other words; single-threaded sequences of concurrent operations may be combined into non-blocking atomic transactions. Executing threads may indicate the transaction boundaries, such as by specifying when a transaction starts and ends, but may not have to acquire locks on any objects. Transaction memory programming techniques may allow transactions that do not overlap in data accesses to run uninterrupted in parallel while aborting and/or retrying transactions that do overlap.

While HTM solutions are generally faster than STM solutions, HTM solutions traditionally do not support certain operations or events while executing a transaction (e.g., context switches, interrupts, function/method entry code, etc.). When such an event happens while executing a hardware transaction, the transaction may have to be aborted. Operations that cause hardware transactions to fail or abort may be referred to as Non-Hardware-Transactionable (NHT) operations. Traditionally, systems implement or support only a single type of transactional memory implementation. Moreover, a programmer generally must know about, and write code to support, the particular interfaces for implementing a system's transactional memory. Even if a system supports a particular transactional memory implementation, that implementation may not support, or guarantee to support, all transactions. For example, a system may support a "best-effort" HTM implementation in which most transactions succeed, but that does not guarantee support for all transactions. Thus, programmers must frequently also include a more flexible, if slower, implementation that guarantees support for all transactions. The programmer may have to specifically write code to support both the faster best-effort implementation and the slower, fallback, implementation at every location in the application for which the programmer wishes to execute instructions atomically.

Since STM implementations may involve multiple, smaller sets of operations combined into a transaction, STM implementations generally need to validate that the set of memory locations involved in a transaction (e.g., either read or written) is in a coherent state before being committed to the transaction. For example, a STM implementation may verify that none of the memory locations read have been changed by another thread while the STM transaction was executing. If another thread has modified a location read by the current STM transaction, committing the current STM transaction may cause memory to become corrupt or otherwise incoherent.

SUMMARY

Transactional Memory (TM) implementations, such as locked-based software transactional memory (STM) implementations, may first determine whether a transaction is a semi-static transaction. According to one embodiment, a transaction may be considered static or semi-static based on whether the locations to be read and written are known in advance, and known not to change during the transaction. A transaction may be considered static if both the locations to be read and those to be written (or modified) during the transaction are static (e.g., known prior to executing the transaction). Similarly, a transaction may be considered semi-static if the locations to be written are known in advance even if the locations to be read are not. Transactions in for which neither the set of locations to be read nor the set of locations to be written are known in advance may be considered a dynamic transaction.

Thus, a transaction may be considered semi-static if the write-set (e.g., the set of locations to be modified) is known in advance. If the transactional memory implementation, such as a STM, determines that the write-set of a transaction is static and that the read-set is not, a semi-static transaction may be attempted.

Semi-static transactions may be executed/implemented without the need to validate the read-set twice, as is frequently the case with fully static transactions. Validating a read-set may, in some embodiments, require a second "pass" over the read-set locations after the write-locations have been locked. When attempting a semi-static transaction, however, the read-set may only be validated once, as will be discussed in more detail according to various embodiments below. For example, a semi-static transaction may verify that the values held in read-set locations have not changed concurrent with the semi-static transaction, such as by utilizing a local or global version clock, reader lists or other technique for validating a consistent view of memory.

In one embodiment, a transaction may first be attempted using a non-semi-static transaction first and then if that transaction fails, the transaction may be retried as a semi-static transaction. Additionally, a write-set may be retained from a failed transactional attempt and reused as part of a semi-static transaction. Thus, a failed transaction may be retried as a semi-static transaction using (or reusing) the write-set from the failed transaction, according to various embodiments. For instance, in one embodiment, a static transaction that fails due to an inability to validate the read-set may be retried as a semi-static transaction, reusing the failed static transaction's write-set.

After determining that a transaction is semi-static (e.g., that is has a static write-set and a dynamic read-set), a transactional memory implementation may then use a version clock, or other incrementing version value, to validate that the locations of a read-set have not-changed (e.g., since the write locations have been locked, for example). After committing the transaction's modifications to the write-set locations, the locks held for the write-set locations may be released. In some embodiments, versioned write locks associated with the write-set locations may be updated to reflect a current, or newly incremented, reference version value, such as from a local or global version clock, in one embodiment.

Figure 1:
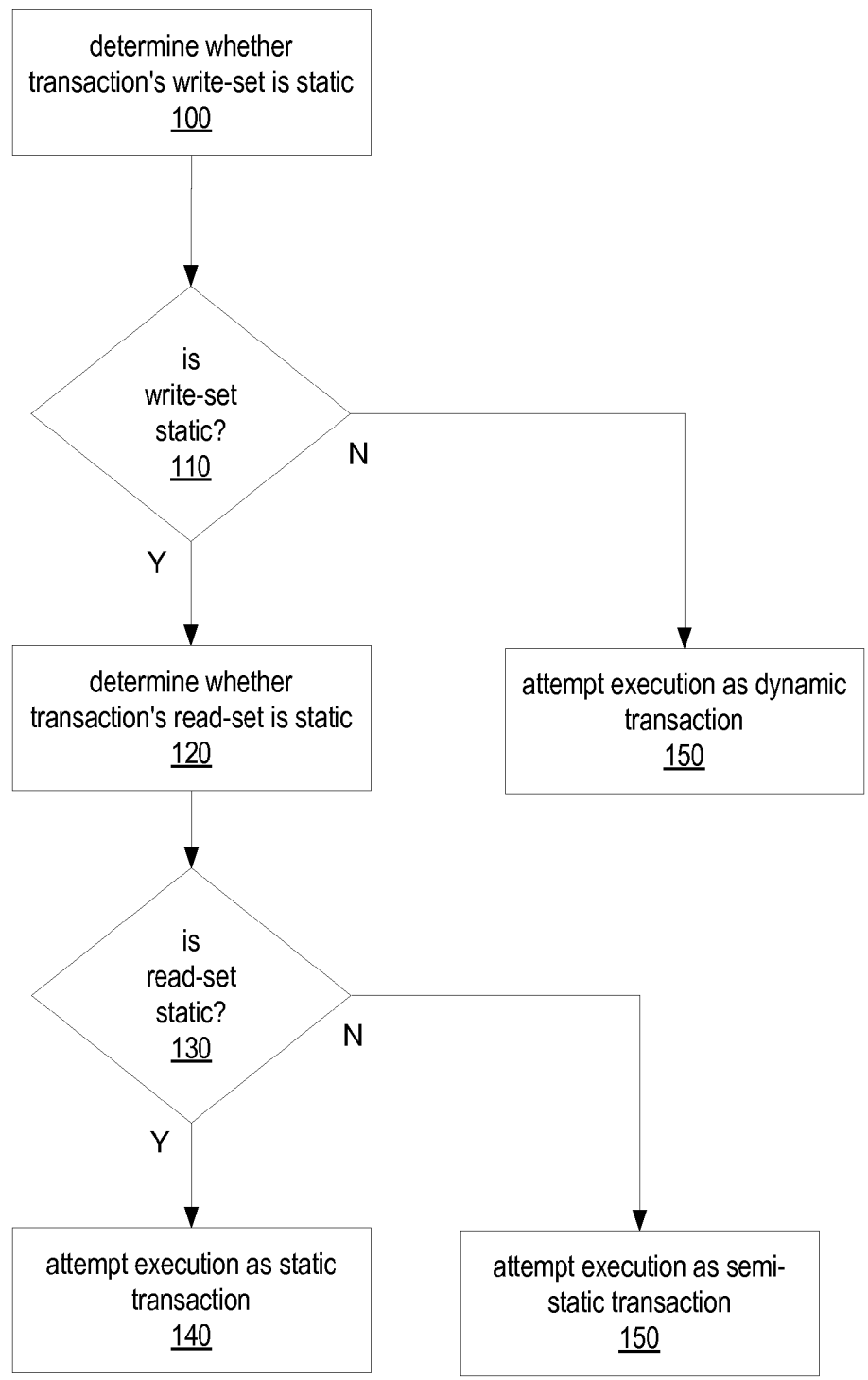
FIG. 1 is a flowchart illustrating one embodiment of a method for executing a transaction including determining, prior to executing the transaction, whether or not the read-set and/or write-set are static, as described herein.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

A transaction may, in some embodiments, be considered semi-static if the write-set of the transaction (e.g., those locations to be modified) is known in advance. Additionally, according to some embodiments, a semi-static transaction's write-set may be known in advance not to change during the transaction. As noted above, a set of locations, such as a read-set or write-set may be considered static if the set of locations is known in advance (e.g., prior to executing the transaction). Transactions in which all locations, both those to be read and those to be modified, are static may be considered static transactions and transactions in which neither the read-set, nor write-set are static may be considered fully dynamic transactions. In static and semi-static transactions, it is the locations of read- or write-set that are known to be static, not necessarily the contents of those locations, according to some embodiments. If the locations are known in advance, even if the values to be written to the locations are not, the write-set may be considered static. For example, a multiple location compare-and-swap (CAS) operation may be implemented as a semi-static transaction because all the locations to be written should be known in advance and the set of locations to be written should not change during execution of the transaction. In other words, in static or semi-static transactions, additional locations (to be modified) may not be added to the write-set during the execution of the transaction.

In some embodiments, if a transaction is attempted as a static transaction, but one or more additional locations to be modified are determined during transaction processing, the transaction may not be considered a static transaction, and in some embodiments, the transaction may fail. If a new location to be read is determined during processing of a static transaction, the transaction may no longer be considered static and, in some embodiments, may be retried as a semi-static transaction. Furthermore, if a new location to be modified is determined during a static or semi-static transaction, the transaction may be considered a dynamic transaction, such as for retry purposes, according to some embodiments. Unlike a write-set, the read-set of a semi-static transaction may be dynamic and may change during transaction processing. In other words, during a semi-static transaction, new locations to be read may be determined and added to the read-set, according to one embodiment.

In some embodiments, a STM implementation may first determine whether or not the read-set and write-set of a transaction are static or not and then attempt to execute the transaction using an appropriate transactional algorithm. In other embodiments, a semi-static transaction may be optimistically attempted first and other transactional algorithms may only be attempted if the semi-static transaction fails. Alternatively, in other embodiments, a transaction may first be attempted not using a semi-static transaction (e.g., as a fully dynamic or fully static transaction) and a semi-static transaction may be attempted if the first transactional attempt fails.

For instance, FIG. 1 is a flowchart illustrating one embodiment of a method for executing a transaction including determining, prior to executing the transaction, whether or not the read-set and/or write-set are static, as described herein. Thus, as indicated by block 100, a transactional memory implementation, such as a lock-based STM implementation, may first determine whether or not the write-set is static. In other words, it may be determined whether or not all the locations of the write-set (e.g., those locations to be written) are known, and known not to change, prior to executing the transaction. If, as illustrated by the positive output of block 110, is it determined that the write-set is static, it may be determined whether the read-set is static, as in block 120. If both the read-set and write-set are static, as indicated by the positive output of block 130, the transactional memory implementation may attempt to execute the transaction as a static transaction, as in block 140. If, however, as indicated by the negative output of block 130, the write-set is static, but the read-set is not, the transaction may be attempted as a semi-static transaction, as in block 150. Alternatively, if the write-set is determined not to be static, the transaction may be attempted as a fully dynamic transaction.

While shown in FIG. 1 as determining whether the write-set is static first and only determining whether the read-set is static if the write-set is found to be static, in other embodiments, a transactional memory implementation may perform these determinations in different orders. For instance, in one embodiment, it may be determined whether the read-set is static before determining whether the write-set is static.

Use of semi-static transactions may, in some embodiments, allow for more optimistic transaction attempts over which static transactions may fail. For example, additions and/or deletions to a concurrent search structure, such as a linked list, may be implemented using either static or semi-static transactions, according to various embodiments. However, a semi-static transaction may be able to more optimistically execute additions and/or deletions to the linked-list than a static transaction. For instance, implementing an addition or deletion to a linked list may ensure (and require) that the read-set be static.

Frequently, ensuring that the read-set is truly static may require traversing the linked list twice, once to initially build the read-set and again, after locking the nodes to be modified, to re-validate the read-set (e.g., verifying that the read-set is indeed static). Thus, if a node along the path to the nodes to be modified as part of a static transaction is changed, such as resulting from another addition or deletion, the read-set of the static transaction may have changed and the static transaction may fail. However, according to some embodiments, a semi-static transaction may be optimistically attempted and it may be assumed that most of the modifications that cause a static transaction to fail may be changes to the read-set, such as changes along the way (e.g., along the path to the nodes of the linked list), may not change the actual write-set (e.g., those locations to be modified). For instance, in the example of the linked list, modifications to nodes along the path to the nodes to be modified during a semi-static transaction may result in a different path to the nodes of the semi-static transaction, but may not actually change the locations to be modified by the semi-static transaction.

In other embodiments, a semi-static transaction may be attempted (optimistically) even if the write-set is not known in advance to be static. For instance, a semi-static transaction may be optimistically attempted and if, during the transaction processing, it is determined or discovered that the write-set is not static, the transaction may be re-tried as another type of transaction (e.g., other than a semi-static transaction).

Additionally, in some embodiments and under certain circumstances, a location may be included in both a read-set and a write-set. If the location is known in advance to be part of both the read-set and write-set, the transaction may be considered a semi-static, or static, transaction. If however, it is not known ahead of time that the location is in the write-set, but it is discovered during the transaction, the transaction may not be considered a static- or semi-static transaction. If it is known that the location is part of the write-set, but it is discovered during the transaction that the location is also part of the read-set, the transaction may not be considered a static transaction, but may be considered a semi-static transaction, according to some embodiments.

In general, according to some embodiments, a transactional version clock may remove the need to maintain and validate (or at least re-validate) a read-set for semi-static transactions. A transaction version clock may be implemented in software, hardware or as a combination of both, according to some embodiments. In one embodiment, the use of a version clock may result in improved performance, such as by avoiding the overhead of read-set revalidation for transactions in which the number of modified locations is relatively small compared to the number of read locations (that would have to be included in a read-set were one to be used and validated).

A STM implementation utilizing semi-static transactions may include use of a version value, such as from a local or global version clock, that may be incremented once by each transaction that writes to memory, and that is read by all transactions. Thus, in some embodiments, all memory locations are augmented, or associated, with a lock that contains a version number. Transactions may begin by reading the current version value, such as from a local or global version clock, and validating every location read against this value. Validating memory locations against this reference version value may ensure that only consistent memory views are ever read during a successful transaction. Writing transactions may need to collect a read-set but read-only transactions may not, according to some embodiments. Once read-sets and write-sets are collected, transactions may acquire locks on locations to be written, increment the version-clock and attempt to commit the transaction, including validating the read-set with reference to the reference version value. Once committed, transactions may update the memory locations' corresponding lock with the new reference version value and release the associated locks.

In some embodiments, a semi-static transaction may first lock all the locations to be modified. Locks for a set of locations, such as for write-set locations, may be acquired in virtually any order, such as by using bounded spinning (trying each lock in series, looping around the set as needed, until all locks are acquired) to avoid an indefinite deadlock. In some embodiments, if locks could not be acquired for every write-set location, the transaction may fail. In other embodiments, however, the transaction may be retried (possibly multiple times).

After locking the write-set locations, a semi-static transaction may validate the locations to be read (e.g., the read-set locations). A read-set location may be validated, according to one embodiment, if: 1) it is not also in the write-set, 2) it is not locked by another process and 3) its corresponding versioned write-lock indicates a reference version value that is not greater than a current reference version value (or other mechanism to determine the consistency of a particular view of memory). In general, if a location is associated with a reference version value greater than a value previously recorded by the transaction, another process may have modified the value for that particular location concurrently with the semi-static transaction.

After committing the modifications to the write-set locations, a semi-static transaction may release the locks previously required. In one embodiment, versioned write locks associated with the write-set locations may be updated to indicate or reflect the currently (incremented) reference version value. Thus, indicating to other processes a relative point in time (in reference to the reference version values) when those locations were last modified. In one embodiment, the lock may be freed and the version value updated using a single store operation, since both the lock and version value may be stored using different bits of a single variable and/or memory location. In some embodiments, the transactional memory implementation may be responsible for specifically storing the reference version value to the versioned write locks, but in other embodiments, storing the reference version value to the versioned write locks maybe the responsibility of a locking system in conjunction with the transactional memory implementation.

In a semi-static transactional memory implementation, every transactional system (i.e., per application or data structure) has a shared reference version variable. In one embodiment, a version counter may be incremented using an increment-add fetch (e.g., implemented as a compare-and-swap (CAS) operation). In other embodiments, alternative or other manners off implementing a version clock may be used. For instance, in one embodiment, a hardware-based version clock may re-read the clock value. In other embodiments, techniques and/or mechanisms other than version clocks may be used to verify and validate that shared memory locations have not been modified between two points in the transaction processing, such as the use of reader lists.

In general, a version clock may be read and incremented by each writing transaction (i.e., each transaction that modified memory) Additionally, a version clock may be read by every read-only transaction (e.g., a transaction that does not modify memory).

In some embodiments, a versioned write-lock may be associated, or correspond to each transactionable (e.g., shareable) memory location. In other embodiments, a single versioned write-lock may be associated with more than one memory location. For instance, in one embodiment, a single versioned write-lock may be associated with a data structure of multiple memory locations (e.g., when the entire data structure is to be locked and shared on as a single, transactionable set of memory. In general, however, every transactionable memory location may be associated with its own corresponding versioned write-lock.

In one embodiment, a versioned write-lock may be implemented as a single word spinlock, such as might use a CAS operation to acquire a lock and a store operation to release it. Since, in general a single bit may be used to indicate that a lock is taken (e.g., held), the remaining bits of a versioned write-lock variable (or memory location) may be used to hold a version number, in some embodiments. This version number may correspond to the value of a version clock at the time that the versioned write-lock or it associated shared memory location, was last modified. In some embodiments, the version number may be advanced, incremented or otherwise updated by every successful lock-release. For example, every time a particular memory location is locked, updated and released, the corresponding versioned write-lock may be updated, such as to hold the current value of a version clock, as will be discussed in more detail below.

Figure 2A:
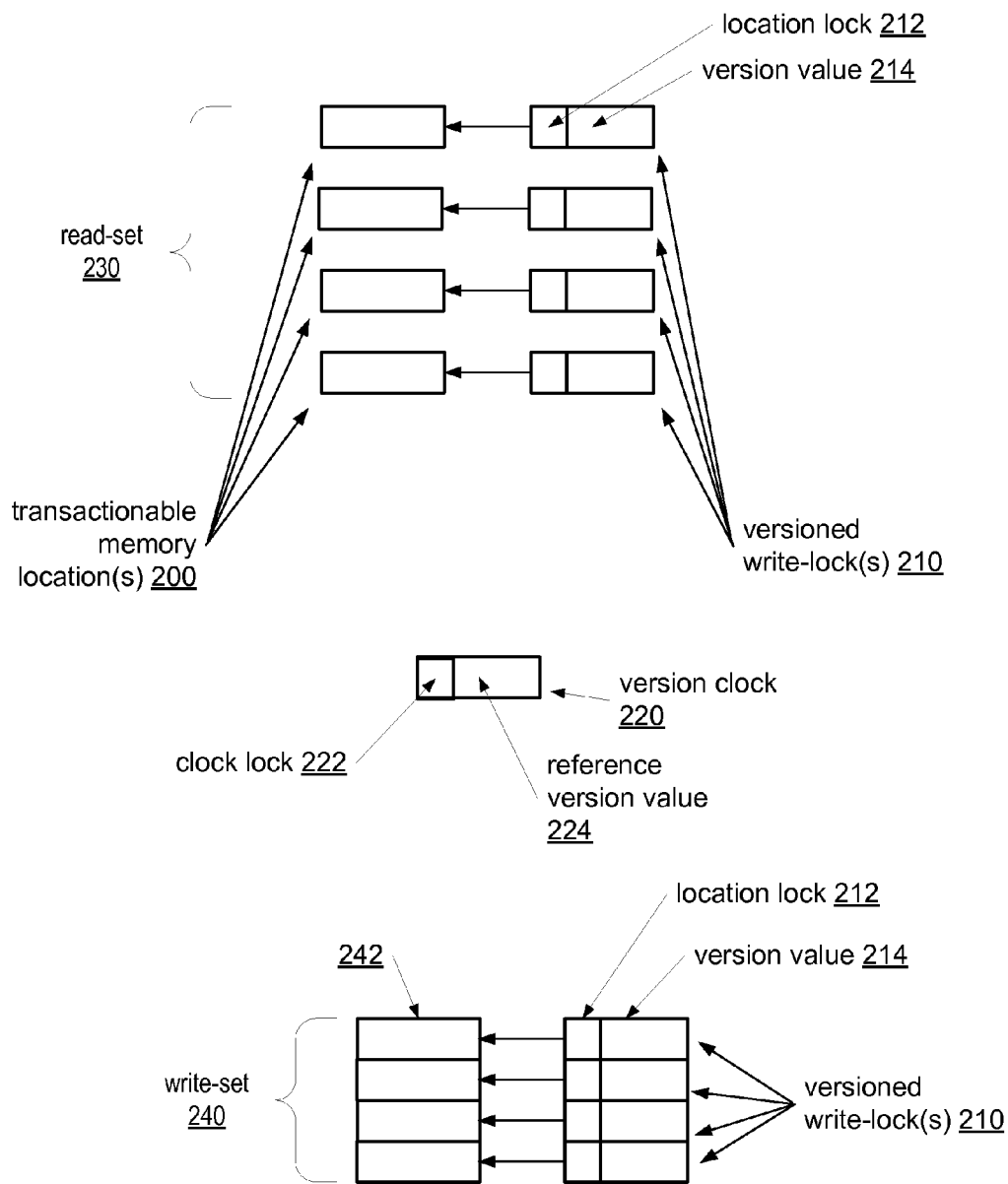
FIG. 2A is a block diagram illustrating, according to one embodiment, an exemplary read-set with corresponding versioned write-locks.

FIG. 2A is a block diagram illustrating, according to one embodiment, an exemplary read-set with corresponding versioned write-locks. FIG. 2A also illustrates an exemplary write-set with corresponding versioned write-locks, as described herein. In some embodiments, only a write-set may include corresponding versioned write-locks. In other embodiments, however, every location, or at least every transactionable location, may be associated with a corresponding versioned write lock, as illustrated in FIG. 2A. An exemplary version clock is also shown in FIG. 2A, according to one embodiment.

In some embodiments, a transaction may maintain thread-local memory buffers or set, such as read-set 230 and write-set 240. A read-set may include the set of locations to be read for the transaction while the write-set may include the set of locations to be written for the transaction. A transaction may include the same location in both the read-set and write-set (e.g., a location that is both read and written for the transaction). Thus, in one embodiment, before reading a location, the transactional implementation may check to see if the location is also included in the write-set. In some embodiments, especially those in which a transaction is "run" and write values are temporarily stored (e.g., in the write-set) before committing the transaction (e.g., writing all the write values to their respective shared memory locations), the value for a memory location may need to be read from the write-set if that particular location is in both the read-set and write-set.

Additionally, a read-set and/or write-set may include additional information, such as values to be stored in write-set locations and/or addresses of locks associated with write-set locations, among other types.

For instance, in some embodiments, every shared or transactionable memory location, such as transactional memory locations 200, may be augmented, or associated with, a lock, such as versioned write-locks 210, that may include a version number or identifier. For instance, each of version write-locks 210 may include respective version values, such as version values 214. In some embodiments, version value 214 may represent the value of a version clock, such as version cloak 220, at the time when the corresponding shared (or transactionable) memory location was last modified. Thus, according to some embodiments, each time a shared memory location is modified, a corresponding version (or clock) value may be updated according to a current value of a version clack 220.

Additionally, as illustrated in FIG. 2A, a versioned write-lock 210 may include, in some embodiments, a location lock 212, used to moderate and/or coordinate sharing of, and parallel access to, the corresponding memory location.

In a semi-static transactional implementation, every transactional system (i.e., per application or per data structure) may have a shared version clock variable. In one embodiment, a version counter may be implemented using an increment and fetch instruction, such as may be implemented using a compare-and-swap (CAS) operation. In other embodiments, however, alternative methods and/or manners of implementing a version clock (or other version value) may be utilized.

In general, a version clock may be read and incremented by each writing transaction (e.g., each transaction that modifies memory). Additionally, a version clock may be read by each ready-only transaction (e.g., a transaction that does not modify memory). In some embodiments, a versioned write-lock may be associated with, or correspond to, each hared (or transactionable) memory location. In one embodiment, a single versioned write-lock may be associated with a data structure including multiple memory locations (e.g., when the entire data structure is to be shared and locked as a single, transactionable set). In general, however, every individual memory location may be associated with a corresponding versioned write-lock.

In one embodiment, a versioned write-lock may be implemented as a single word spinlock, such as might be accessed using a CAS operation to acquire the lock and a store operation to release the lock. Since, in general, a single bit may be used to indicate whether a lock is held, the remaining bits of a versioned write-lock variable (or memory location) may be used to hold a version number, such as a reference version value from a version clock 220, according to some embodiments The version number stored in the versioned write-lock may correspond, in one embodiment, to a value of the version clock at the time that the memory location associated with the versioned write-lock was last modified or updated. The version number may be advanced, incremented or otherwise changed by every successful lock-release. For instance, every time a particular memory location is locked, updated and released, the corresponding versioned write-lock may also be updated to hold the current value of the version clock, according to some embodiments.

Similarly, a version clock 220 may also include a lock field, such as a clock lock 222, for coordinating access and modifications to the version clock. In other embodiments, a separate utility may coordinate and/or manage the version clock while providing access and/or control to transactions, such as to increment the clock or to obtain a current value for the clock. Specifically, multiple threads, or processes, may utilize clock lock 220 to coordinate parallel access to reference version value 224. When updating the value of clock lock 222, such as to lock clock 220, a process (e.g., transaction) may, in some embodiments, first verify that another process does not have clock 220 locked. In other words, a process may verify that another process is not currently accessing clock 220. In some embodiments, a process may use a compare-and-swap (CAS) instruction to both ensure that no other process has clock 220 locked and also to lock clock 220. A CAS instruction may be used to set a particular value to a location only if the location currently holds a certain value. For example, when attempting to lock version clock 220, a process may use a CAS instruction to mark the version clock lock 222 as locked (e.g., by storing a '1') only if version clock lock 222 is not currently locked (e.g., it contains a '0'), according to one embodiment. In other embodiments, processes (e.g., transactions) may only perform version clock locking indirectly, such as by utilizing a shared clock (or version) API that ensures proper parallel access to a version clock or other versioning mechanism. As noted above, in some embodiments, the version value 224 of clock 220 may be updated, such as incremented, by every successful (and in some cases unsuccessful) transaction.

Additionally, use of individual version values 214 and individual location locks 212 may, in some embodiments, allow a transaction to verify whether or not the current read-set and/or write-set represents a consistent, or coherent, view of memory. In other words, a transaction may verify, via version values 214 and/or location locks 212, that no location (of the read-set or write-set) has been modified since a particular point in time, such as since the write-set locations were locked, for example.

For instance, according to one embodiment, if a transaction records a memory location's version value 214 and the value of the memory location itself, the transaction may be able to determine whether another process modifies that particular location later. Furthermore, a transaction may use only the clack values for particular locations and rely on the fact that any other process that might modify those locations will also increment the clock 220. Thus, if a transaction determines that a particular location's corresponding version value 214 is greater than the clock value recorded previously, another process may have modified the particular location.

In some embodiments, a location-specific clock value, such as version value 214, that is greater than a reference version value of a previously recorded by the transaction may indicate that the location was modified since the transaction read the reference version value. For example, if a transaction records the value of version clock 220 when constructing a read-set (or when locking the write-set) and subsequently determines that a location's corresponding version value 214 is greater than the recorded clock version value, the location may have been modified since the time that the transaction recorded the reference version value.

As noted above, when performing lock-based transactional memory, transactions may be configured, to acquire locks on locations, such as transactionable memory locations 200, to be modified. After acquiring locks for the locations to be modified, transactions may verify, prior to committing the transaction, that the locations, either the read-set, write-set or both according to different embodiments, have not been modified subsequently. Furthermore, as noted above, in some embodiments, every shared memory location's corresponding version value 214 may be updated every time the location's contents change. Thus, when committing a transaction, the corresponding version value 214 for each location modified may be updated to reflect the current value of the version clock 220. In other embodiments, however, a transaction may increment the version clock, prior to committing the transaction. For instance, after locking the locations to be written, a semi-static transaction may increment-and-fetch the reference version value of version clock 220 and may also record the returned (incremented) value, such as for subsequent use validating locations.

After modifying the contents of the write-set locations, a semi-static transaction may update the individual version value 214 for each location modified to reflect the newly incremented (or otherwise modified) reference version value. For instance, a semi-static transaction may modify memory location 242 (of FIG. 2), but may first acquire a lock for that location. Once holding the lock on location 242, the transaction may increment (and-fetch) reference version value 224 of version clock 220. When committing the transaction's new values to the write-set locations, the transaction may also save the incremented reference version value to the location's version value 214 (of the location's corresponding versioned write-lock 210).

Read-sets and write-sets may be implemented in any of various ways and may vary from embodiment to embodiment. For example, read-sets and write-sets may be maintained using linked lists of data structures identifying the memory locations, as will be discussed in more detail below.

After reading, or otherwise determining, the current value of the reference version clock 220, a transaction may build, or collect, a read-set and/or a write-set. As illustrated in FIG. 2, a read-set may specify a number of locations to be read during the transaction, while a write-set may specify locations to be written to during the transaction. For instance, a linked-list may be used in some embodiments, while other may use arrays, to store read- and write-set locations.

Read-sets and write-sets may be implemented in any of various ways and may vary from embodiment to embodiment, For example, read-sets and write-sets may be maintained using linked lists of data structures identifying the memory locations in the read-set or write-set. A TM implementation may, in some embodiments, construct read-sets and/or write-sets by executing a "look-ahead" version of the atomic block to identify and record the locations to be accessed (either for reading or writing) transactionally.

Figure 2B:
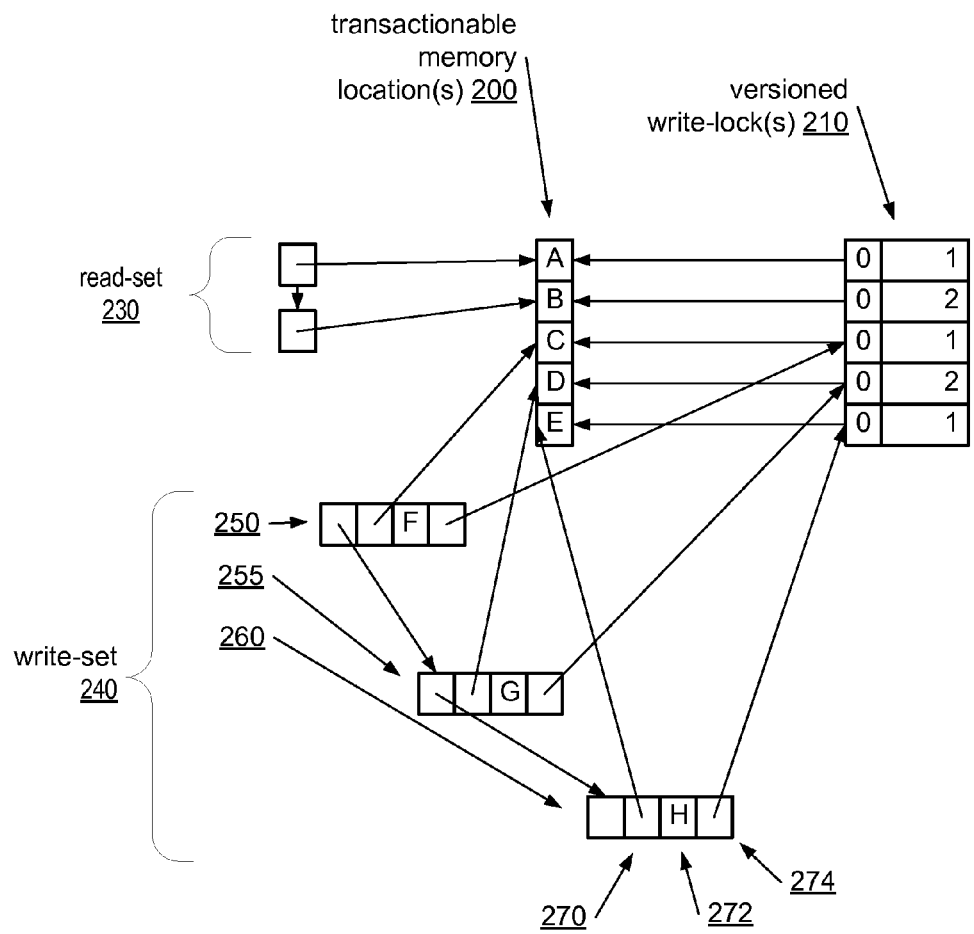
FIG. 2B is a block diagram illustrating one example embodiment using linked lists to maintain a read-set 230 and a write-set 240.

FIG. 2B is a block diagram illustrating one example embodiment using linked lists to maintain a read-set 230 and a write-set 240. FIG. 2B shows read-set 230 including two nodes, each indicating a particular memory location. Each of the nodes in the read-set 230 may include a pointer to the indicated memory location, but in other embodiments, other methods may be used to indicate memory locations. Write-set 240 shown in FIG. 2B includes three nodes 250, 255 and 260. Unlike read-set 230 however, the nodes of write-set 240 not only just indicate the particular memory locations, but also may include additional information, such as address 270 to identify the corresponding versioned write-lock 210, value 272 to indicate the value to be stored in the particular memory location as part of the transaction and address 274 indicating the corresponding versioned write-lock 210, according to some embodiments. A read-set, according to some embodiments may not include this additional information because the transaction may not lock or update memory locations in the read-set.

In some embodiments, however, a read-set may also store the value read from the corresponding versioned write-lock 210 (without storing an indication of the location of the write-lock), such as to simplify validating the read-set later. In general, however, a semi-static transaction may not need to maintain a copy of the location value from a read-set location's versioned write-lock. Additionally, in some embodiments, a read-set may store either an indication of the memory location-or an indication of the corresponding versioned write-lock, since, in general, the memory location and write lock are associated such that one may be determined, identified and/or located from the other. Thus, a read-set may not need to include indications of both.

As shown in FIG. 2B, each node of write-set 240 may include an indication of the particular memory location, the value to be written to the location (as part of the transaction) and an indication of the location's corresponding versioned write-lock (such as the address of the versioned write-lock). In other embodiments, read-set and write-sets may include or maintain different, additional or fewer types of data.

FIG. 2B shows a read-set 230 including two nodes, each indicating a particular memory location. Each of the nodes in the read-230 illustrates a pointer to the indicated memory location, but other embodiments may use other methods to indicate particular memory locations. FIG. 2B also illustrates a write-set including 3 nodes. Unlike the read-set 230, write-set 240 has nodes that not only indicate the memory location, but also include information identifying the corresponding versioned write-lock 210 and may also include an indication of the value to be stored in the particular memory location during the transaction. A read-set may not need to maintain or include the address of the corresponding versioned write-lock. In some embodiments, a read-set may also store the value read from the corresponding versioned write-lock 210.

In general, however, semi-static transactions may not need to maintain a copy of the location value from a location's versioned write-lock. Additionally, in some embodiments, a read-set may only maintain either an indication of the particular memory location or an indication of the corresponding versioned write-lock since, in general, the location and write-lock are associated such that one may be determined, identified and/or located from the other. Thus, a read-set may not have to keep indications of both, according to some embodiments.

As shown in FIG. 2B, each node of write set, 240 includes an indication of the particular memory location, the value to be written to the location when the transaction is committed and an indication of, such as the address of, the location's corresponding versioned write-lock 210. In other embodiments, read-sets and write-sets may include and/or maintain more, less and/or different types of data and/or indications.

Figure 3:
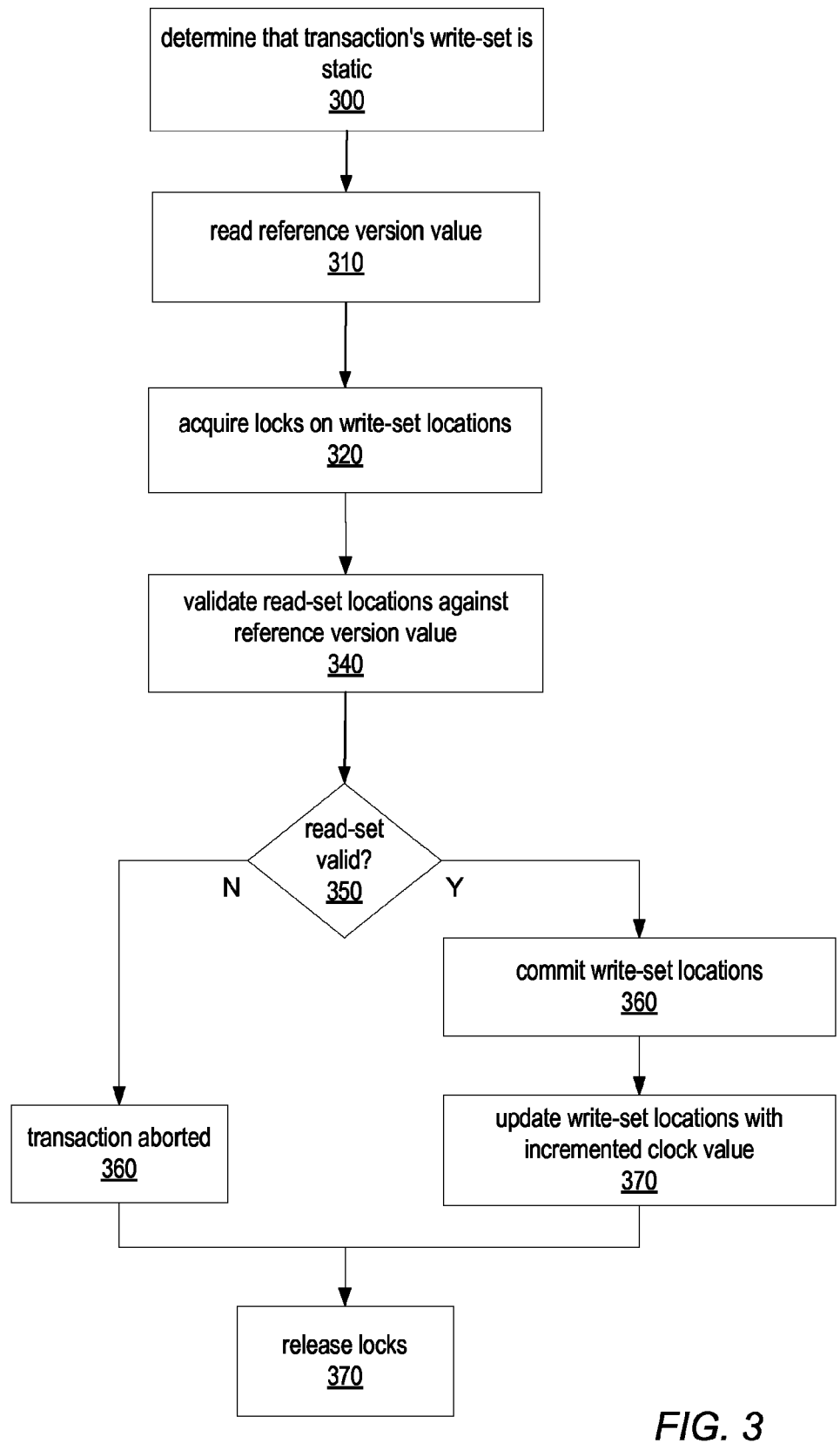
FIG. 3 is a flowchart illustrating one embodiment of a method for executing transactions as described herein.

FIG. 3 is a flowchart illustrating one embodiment of a method for executing transactions as described herein. As noted above regarding FIG. 1, transactions may first be determined to be dynamic, static or semi-static. For instance, as shown in block 300, it may be determined whether or not the transaction's write-set is static, according to some embodiments. A transaction with a static write-set may be considered a static or semi-static transaction depending upon whether or not the read-set is dynamic or static. Thus, in some embodiments, it may be determined whether a transaction's read-set is static or not. If, as described above, the write-set is static and the read-set is dynamic, the transaction may be considered a semi-static transaction. In some embodiments, rather than explicitly determining whether the transaction is semi-static, a transaction may be optimistically attempted as a semi-static transaction.

After it is determined that a transaction is semi-static, or should be (optimistically) attempted as semi-static, the version clock may be read and in some embodiments, incremented. Furthermore, as noted above, the reference version value may be incremented and read using a single operation, such as an increment-and-fetch instruction. Other embodiments may read and/or increment a version clock or value in other ways and using other techniques or may use a different technique to verify/validate whether a consistent memory state that does not involve a version clock at all, as described above.

After incrementing and reading the version clock, a transaction may acquire locks for the locations to be modified. As noted above regarding FIG. 2, a transaction may lock a location via a corresponding version lock 212 and/or via a corresponding location version value 214. However, various methods and manners of sharing and/or locking memory may be implemented as part of semi-static transactional processing, according to various embodiments. In general, a transaction may acquire locks on one or more shared or transactionable memory locations in any of various ways.

After holding the locks for the write-set locations, a transaction may then validate the read-set locations, as indicated by block 340, according to one embodiment. If the read-set locations are validated, as indicated by the positive output of decision block 350, the transaction may commit the write-set locations with their respective modifications. As part of committing the transaction may also update the modified location's corresponding location version values 214 to reflect the value of the incremented clock value recorded previously. In other embodiments, however, the transaction may use one value from the version clock to validate the read-set, but rely on another when committing the write-set. For instance, a transaction may read the current value from clock 220 and use that value to validate the read-set (and possibly the write-set) but then use a newly incremented value to commit the write-set.

However, if the read-set locations are not validated, as indicated by the negative output of decision block 350, the transaction may be aborted or otherwise fail, as indicated by block 360. In some embodiments, the transaction may be retried, either as a semi-static transaction again or as some other type of transaction, if the read-set locations are not properly validated. Additionally, whether or not the transaction was successfully committed, any locks held may be released, as indicated by block 370. In some embodiments, however, the locks may be retained and used when retrying the transaction, as will be discussed in more detail below.

In some embodiments, the STM implementation using semi-static transactions may optimistically run through a fully dynamic transaction and collect a set of locations that should be locked (e.g., the write-set), then run the same transaction again as a semi-static transaction using the previously constructed write-set as a static write-set since the locations to be locked will be known from the failed, fully dynamic, transactional attempt. In some embodiments, the locks acquired by the failed transaction may be reused (e.g., without freeing and re-acquiring) when retrying the transaction as a semi-static transaction.

Furthermore, in some embodiments, the read-set and write-set may be validated using the current reference version value, such as from clock 220, such as to ensure that the locations are in a consistent (or coherent) state before proceeding. For example, in one embodiment, a transaction may validate each location in the read or write-set against the reference version value, such as from global version clock 220. In other embodiments, however, validating a read-set or write-set may be performed by comparing respective version values for each location in the set against a local (e.g., local to the transaction) version value instead of a global version value. Additionally, some embodiments may utilize techniques for verifying or validating that read-sets and/or write-sets correspond to consist states of memory that do not involve a global clock, such as via transaction local clocks or reader lists. For instance, in one embodiment, location-specific version values may be compared against a transaction-local version clock or against another mechanism providing incrementing version values.

Figure 4:
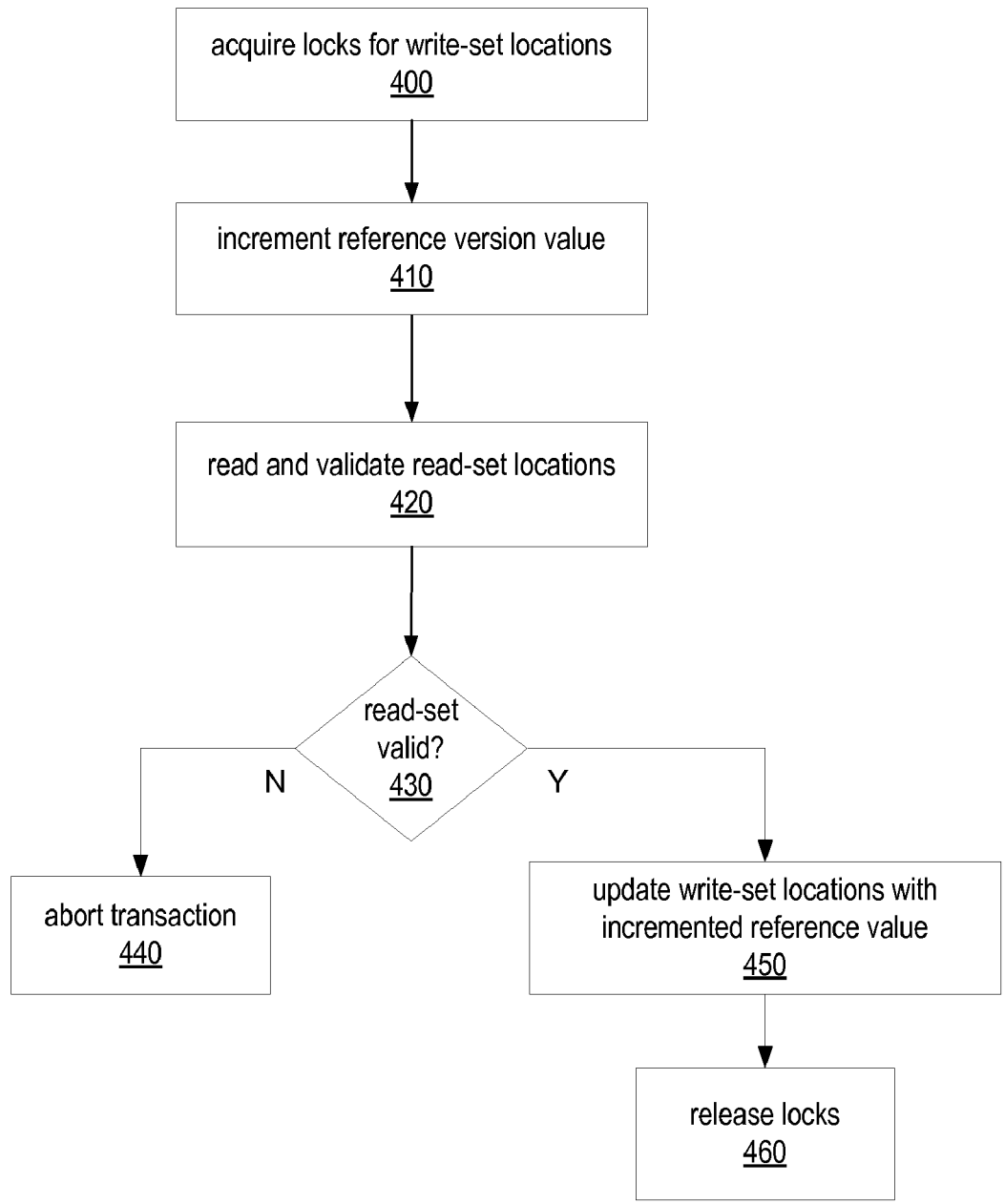
FIG. 4 is a flowchart illustrating one embodiment of a method for transaction processing using semi-static transactions, as described herein.

FIG. 4 is a flowchart illustrating one embodiment of a method for transaction processing using semi-static transactions, as described herein. In some embodiments, a transaction process may acquire locks for one or more hared memory locations to be updated or modified during the transaction, such as by using a write-set 240, as indicated by block 400. Once locks have been acquired for all of the write-set locations, the transaction may increment (and fetch) the reference version value, as in block 410. As noted above, the transaction may then validate the read-set locations, as in block 420. If, as indicated by the positive output of block 430, the read-set is validated, the transaction may update (or commit) the write-set locations including storing the incremented reference version value to each location's corresponding version value 214, as indicated by block 450. After the transaction is successfully committed, the transaction may release any acquired locks, as in block 460. Please note, that while not illustrated in FIG. 4, in some embodiments, a transaction may release acquired locks, as in block 460, even if the transaction is aborted as in block 440. In other embodiments, however, as described above, a failed or aborted transaction may not release the locks. Instead, the locks of an abort transaction may be reused when re-trying the transaction.

Figure 5:
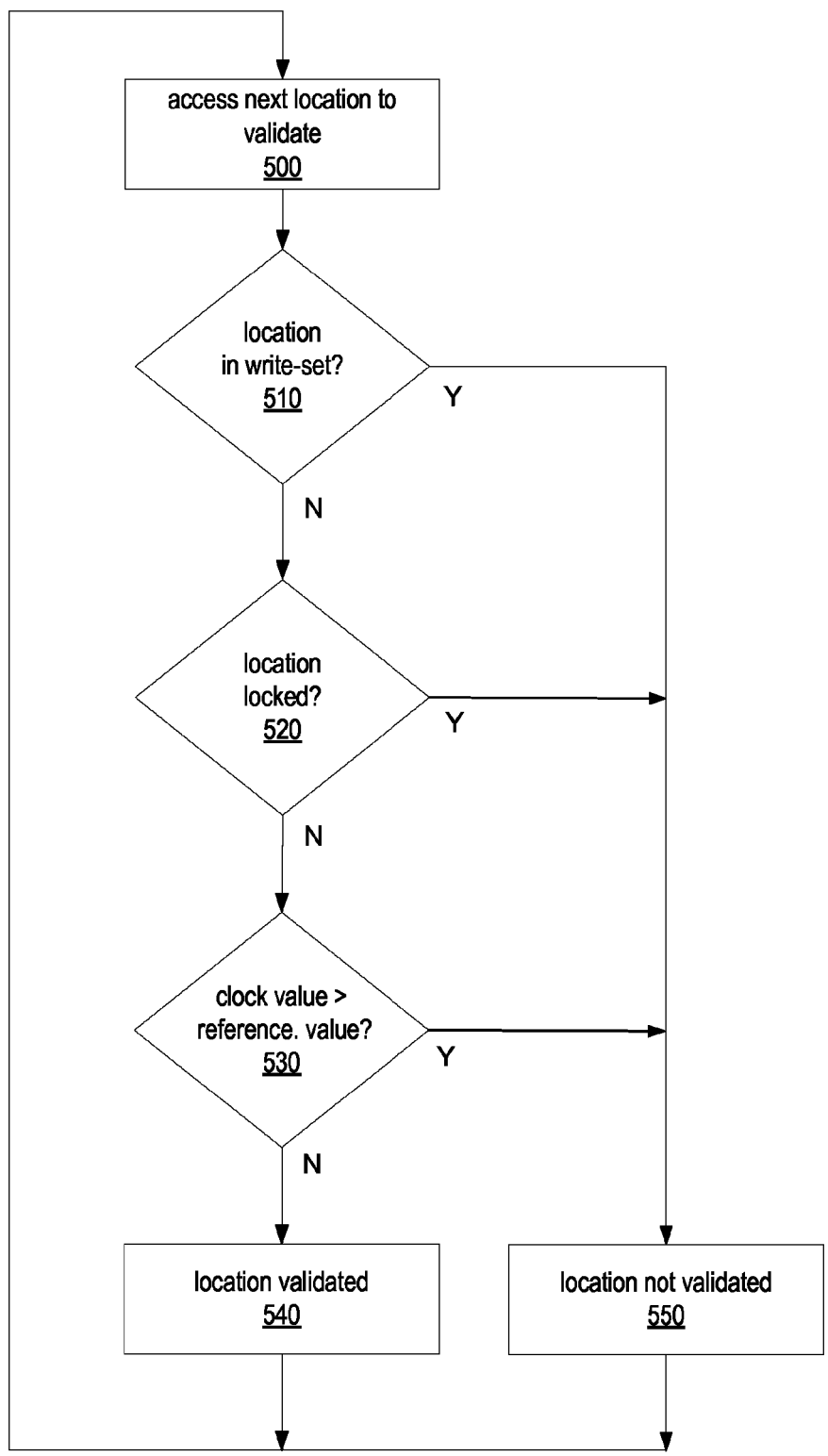
FIG. 5 is a flowchart illustrating one embodiment of a method for validating a read-set, as described

FIG. 5 is a flowchart illustrating one embodiment of a method for validating a read-set, as described herein. For instance, a transaction may validate each shared memory location included in the read-set. According to one embodiment, a transaction may access the next memory location to be validated, as indicated by block 500. Different criteria for determining whether or not a particular location is validated may vary from embodiment to embodiment. In one embodiment, for instance, if the particular memory location (of the read-set) is also in the write-set, or is locked by another process or thread, or if the location's corresponding lock indicates a version value greater than the current (or newly incremented) reference version value, as indicated by the positive outputs of blocks 510, 520 and 530, respectively, the particular memory location may not be validated, as indicated by block 550. Conversely, a particular location may be validated, as indicated by block 540, if the memory location is not also in the write-set, is not locked by another process, and if the location's corresponding version value is not greater than the current (or newly incremented) reference version value 224 of version clock 220.

Figure 6:
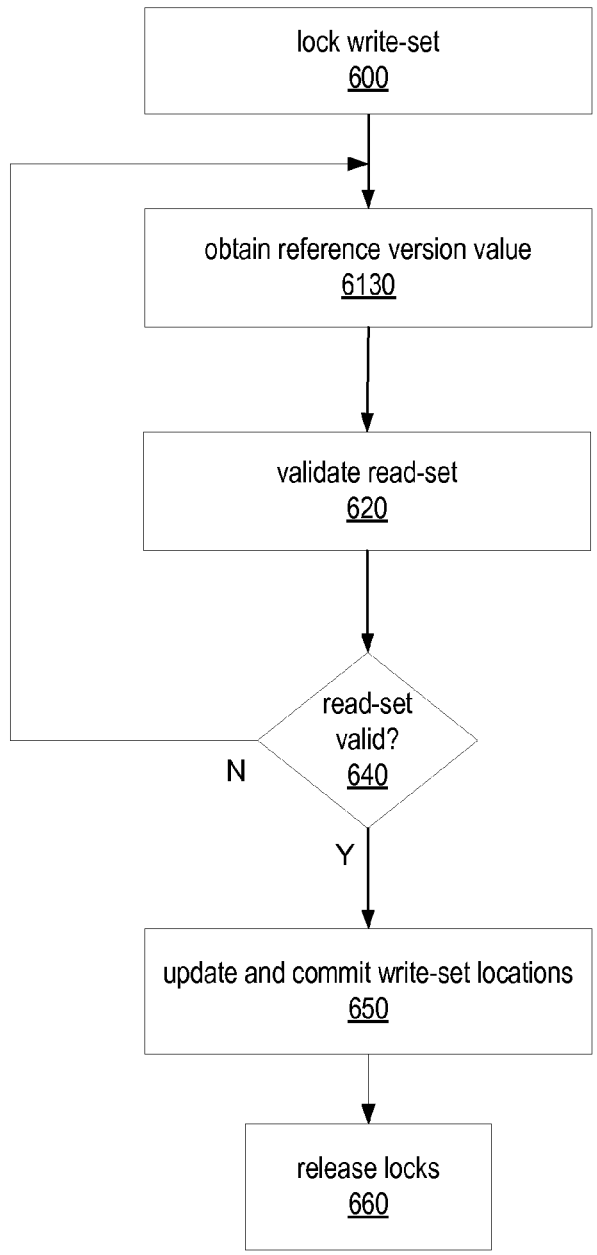
FIG. 6 is a flowchart illustrating one embodiment of a method for executing a transaction using a semi-static transaction with multiple attempts to validate the read-set, as described herein.

FIG. 6 is a flowchart illustrating one embodiment of a method for executing a transaction using a semi-static transaction with multiple attempts to validate the read-set, as described herein. As described above, a transaction may acquire locks on the write-set locations, as indicated by block 600. After the write-set locations are locked, the transaction may read and increment (e.g., increment-and-fetch) the reference version value, such as from clock 220, as indicated by block 610. The transaction may then attempt to validate the read-set, as in block 620. If, as indicated by the negative output of block 640, the read-set is not validated, rather than simply aborting or failing the transaction, as described above, the semi-static transaction may again increment and read the reference value, as indicated by the arrow leading back to block 610.

Thus, while in some embodiments, a transaction may fail if the read-set is not validated, in other embodiments, the transaction may attempt more than once to validate the read-set. If the read-set is validated, either in a single or multiple attempts, the transaction may then update and commit the write-set locations, as shown in-; block 650 and may also release any lock, as in block 660.

Figure 7A:
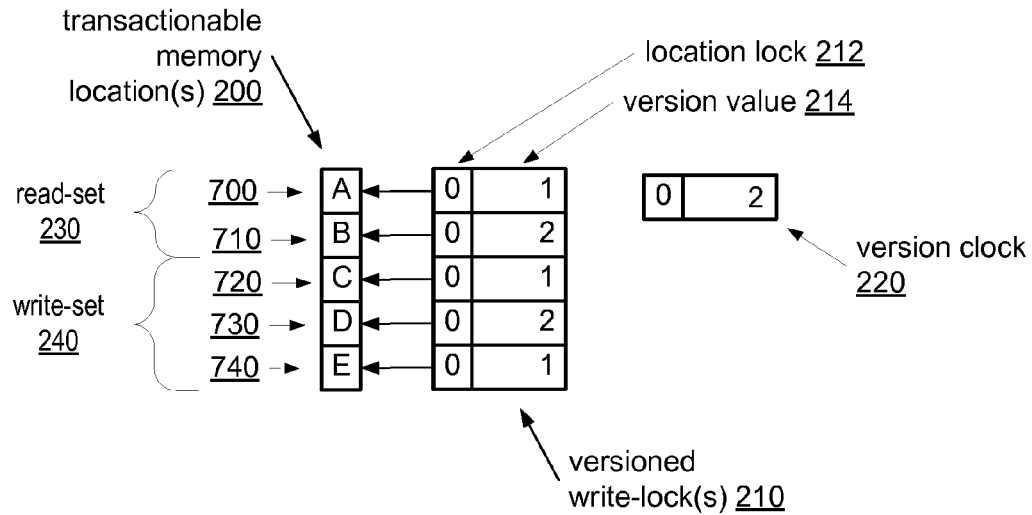
FIGS. 7A and 7B are block diagrams illustrating the logical sequence of stages during a semi-static transaction, according to one embodiment.
Figure 7B:
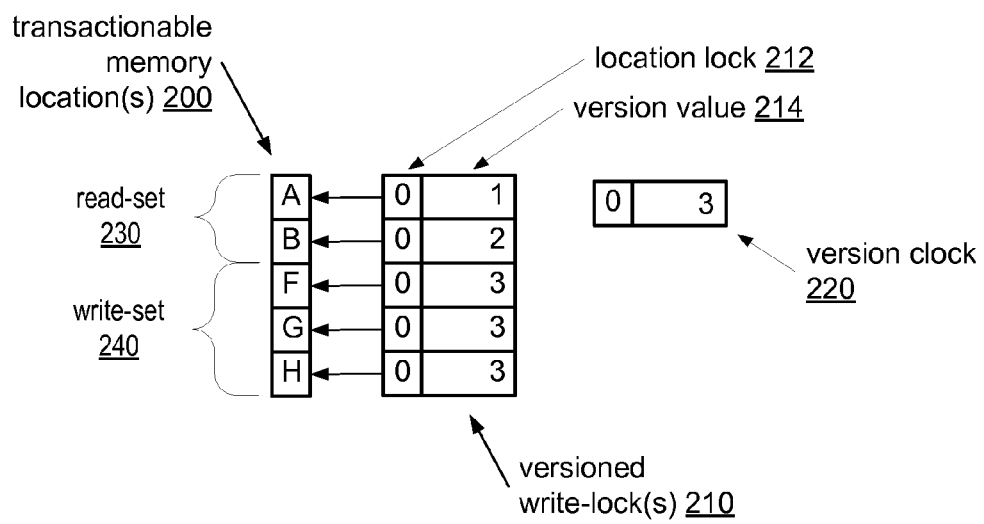

FIGS. 7A and 7B are block diagrams illustrating the logical sequence of stages during a semi-static transaction, according to one embodiment. For instance, FIG. 7A illustrates an exemplary set of shared memory locations, example data, values, corresponding versioned write-locks (with example data), as well as a version clock with example values. FIG. 7A may represent an exemplary view of memory prior to, or at, the start of a semi-static transaction. While FIG. 7A illustrates both a read-set and a write-set, transaction may not utilize both a read-set and a write-set in some embodiments. For example, a transaction may not construct or maintain a read-set, according to some embodiments.

As shown in FIG. 7A, read-set 230 includes two locations containing the values, 'A' and 'B', respectively. Similarly, write-set 240 includes three locations with values of 'C', 'D' and 'E', respectively. As can be seen from the example data in the corresponding write-locks, locations 700, 720 and 740 were last updated or modified when the version clock 200 held a value of '1'. Similarly, locations 710 and 730 were most recently modified, as indicated by their corresponding version locks holding a value that is the same as currently held in version clock 220.

As noted previously, a semi-static transaction may (increment and) read the current value from version clock 220 and record that value for future reference, such as to validate the read-set, according to some embodiments. Thus, in the example illustrated, the transaction may read the value '2' from version clock 220. While FIG. 7A illustrates a single digit as the value of clock 220, the number, size and values storable in a versioned write locks and other version values may vary from embodiment to embodiment.

After obtaining the reference version value, the transaction may validate the read-set (after acquiring locks for the write-set in some embodiments). In some embodiments, validating a read-set may include, for example, verifying that each location in the read-set is not also in the write-set (e.g., the location is not one to be modified), that it is not locked by another process or thread (e.g., by checking the value of the corresponding versioned write lock 210) and that the location's corresponding versioned write lock indicates a version value 214 that is not greater than the reference version value read prior to locking the write-set (e.g., that the location has not been modified by another thread).

After validating the read-set the transaction may then commit the modifications to the write-set locations and release any locks. FIG. 7B illustrates an example read-set and write-set after the transaction has updated (and committed) the modifications to the write-set locations. Thus, as shown in FIG. 7B, clock 220 holds a value of '3' while the three location in the write-set have been modified from 'C', 'D', and 'E', respectively, to 'F', 'G' and 'H', also respectively. Additionally, the corresponding versioned write-locks have been updated to hold a value of '3', corresponding the current value of the reference version value, such as may be held in version clock 220 according to some embodiments.

Figure 8:
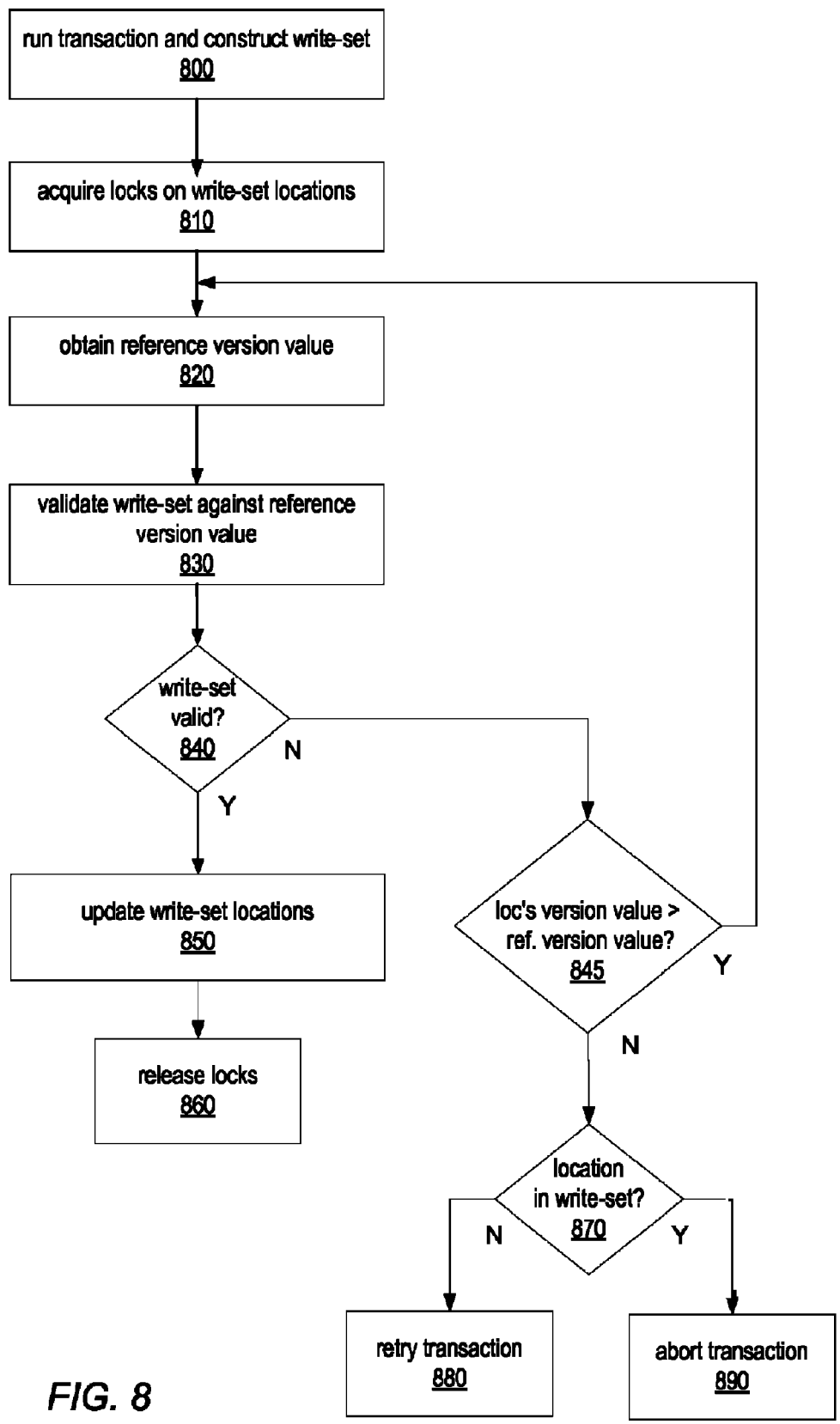
FIG. 8 is a flowchart illustrating one embodiment of a method for transaction processing without using a read-set, as described herein.

FIG. 8 is a flowchart illustrating one embodiment of a method for transaction processing without using a read-set, as described herein. After constructing a write-set, locking the write-set memory locations and incrementing the version clock, as shown in blocks 800, 810 and 820, a transaction process may try to validate the write-set memory locations against a version clock, as in block 830 and described previously. If, as indicated by the positive output of block 840, the write-set memory locations are validated, the transaction process may update the write-set memory locations and release the acquired locks, as in blocks 850 and 860. As noted previously, a transaction may update write-set memory locations with their respective new values and may also store the incremented reference version value to each location's corresponding versioned write-lock.

If, however, if a particular write-set memory location cannot be validated, as indicated by the negative output of block 840, and if the particular memory location's corresponding clock value is greater than the incremented clock value, the transaction process may increment the clock again and again try to validate the write-set, as shown by the positive output of block 845.

If a particular memory location of the write-set causes the write-set to fail validation and if the particular memory location's corresponding version value 214 is not greater than the incremented reference version value, as indicated by the negative output of block 845, the transaction process may verify that the location is in the write-set as in block 870. If the write-set is not validated because a particular memory location is not in the write-set, as shown by the negative output of block 880, the transaction may be retried as in block 880, such as by constructing both a read-set and a write-set in some embodiments. In general a transaction may be retried using any of the transaction processing methods described herein. While not illustrated in FIG. 8, when a transaction is aborted any acquired locks may be released, as described above regarding block 860.

Figure 9:
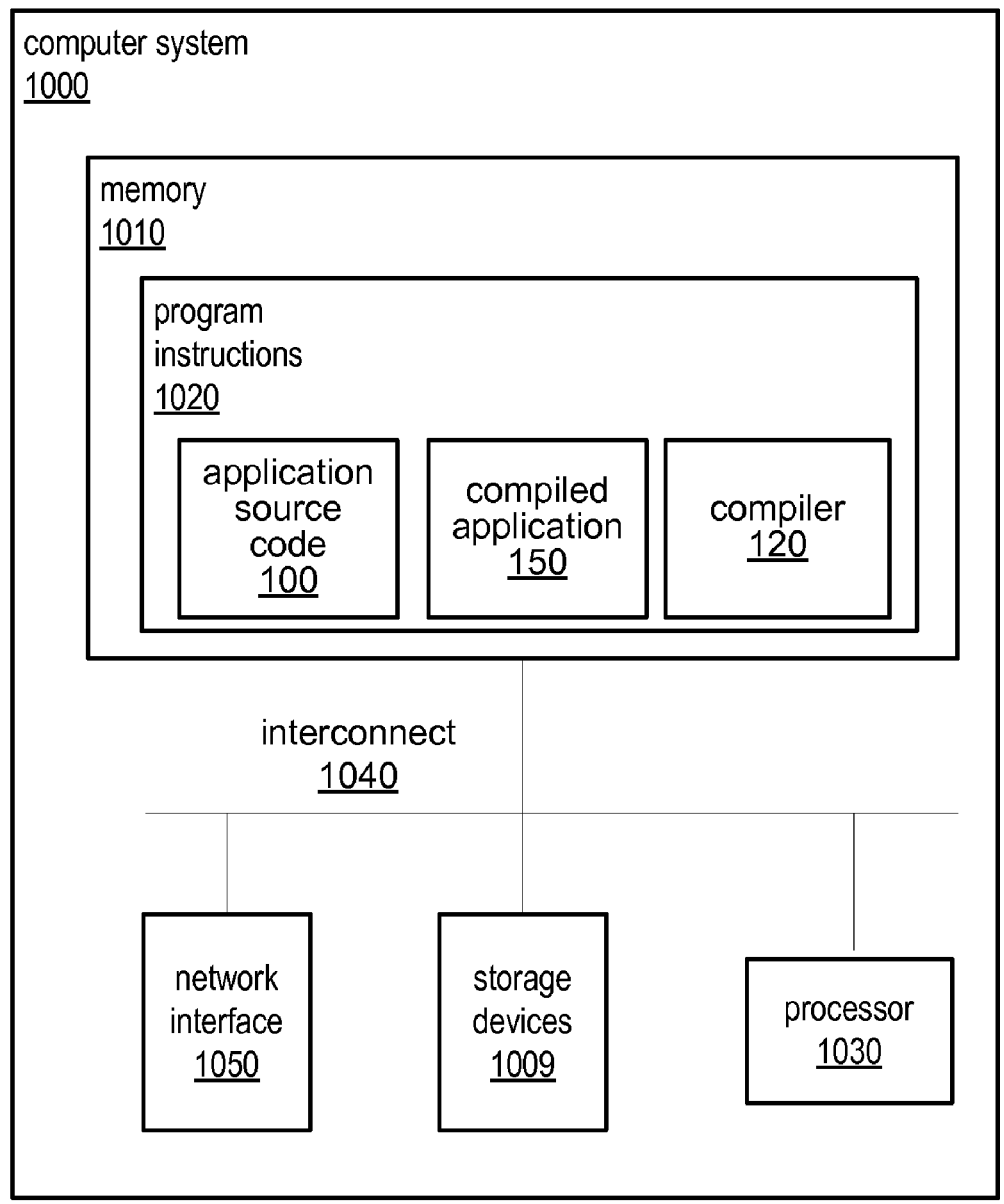
FIG. 9 is a block diagram illustrating one embodiment of a exemplary computer system on which transactional memory implementations, including semi-static transactions may be implemented.

FIG. 9 is a block diagram illustrating one embodiment of a computing system capable of implementing transactional memory implementations, such as semi-static transaction, as described herein according to various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The described invention may be provided as a computer program product, or software, that may include a computer-readable storage medium having stored thereon instructions, which may be used to program a computer system (or other electronic devices) to perform a process according to the present invention. A computer-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magnetooptical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A computer system 1000 may include a processor unit 1030 (possibly including multiple processors, a single threaded processor, a multi-threaded processor, a multi-core processor, etc.). The computer system 1000 also includes one or more system memories 1010 (e.g., one or more of cache, SRAM DRAM, RDRAM, EDO RAM, DDR RAM, SDRAM, Rambus RAM, EEPROM, etc.), a system interconnect 1040 (e.g., LDT, PCI, ISA, etc.), a network interface 1050 (e.g., an ATM interface, an Ethernet interface, a Frame Relay interface, etc.), and a storage device(s) (e.g., optical storage, magnetic storage, etc.). The memory medium may include other types of memory as well, or combinations thereof. Embodiments of the invention may include fewer or additional components not illustrated in FIG. 10 (e.g., video cards, audio cards, additional network interfaces, peripheral devices, etc.). The processor unit 1030, the storage device(s)

1009, the network interface 1050, and the system memory 1010 are coupled to the system interconnect 1040. One or more of the system memories 1010 may embody a compiler configured to generate program instructions for implementing split hardware transactions as described herein. Additionally, one or more of the system memories 1010 may embody an application including code implementing split hardware transactions.

In some embodiments, memory 1010 may include program instructions 1020 configured to implement a compiler, such as compiler 220, configured to provide generate program instructions for implementing transactions, as described herein. Additionally, program instructions 1020 may comprise application source code 200 including code configured to request or specify atomic blocks or other transactional indications, as described herein. Compiler 220, application source code 100, and/or compiled application 150 may each be in any of various programming languages or methods.

While the invention has been described with reference to various embodiments, it will be understood that these embodiments are illustrative and that the scope of the invention is not limited to them. Although the embodiments above have been described in detail, numerous variations and modifications will become apparent once the above disclosure is fully appreciated. Many variations, modifications, additions, and improvements are possible. More generally, the present invention is described in the context of particular embodiments. For example, the blocks and logic units identified in the description are for understanding the described invention and not meant to limit the described invention. Functionality may be separated or combined in blocks differently in various realizations of the invention or described with different terminology. Plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow. It is intended that the following claims be interpreted to embrace all such variations and modifications.

What is claimed is:

1. A computer-implemented method, comprising:
    determining that:
        at least one of a plurality of shared memory locations to be read during processing a software transaction is not known in advance of said processing; and
        each one of the plurality of shared memory locations to be written during said processing the software transaction is known in advance of said processing;
        wherein each of the plurality of shared memory locations is associated with respective version value that is updated, based on a value of a version clock shared by the plurality of shared memory locations, when the shared memory locations is modified;
    in response to said determining:
        obtaining a current value of the version clock; and
        locking each one of the plurality of shared memory locations that is to be written during said processing the software transaction; and
    in response to said obtaining and said locking:
        performing said processing the transaction to discover which of the plurality of shared memory locations is to be read during said processing the software transaction;
        verifying that each one of the plurality of shared memory locations to be read during said processing the software transactions has not been modified since said obtaining; and
        in response to said verifying, attempting to commit the software transaction, wherein said attempting comprises updating both:
            the values stored in each of the plurality of shared memory locations to be written during said processing the software transaction; and
            the respective version value associated with the shared memory location storing the updated value.

2. The method of claim 1, wherein said verifying comprises determining that, for each of the plurality of shared memory locations to be read during said processing the software transaction, a corresponding current version value associated with the shared memory location is not greater than the value of the version clock that was current during said obtaining the current value of the version clock.

3. The method of claim 1, further comprising verifying, prior to said attempting to commit the software transaction, that each one of the plurality of shared memory locations to be read during said processing the software transaction is not locked by another transaction execution.

4. The method of claim 1, further comprising verifying that each of the plurality of shared memory locations to be read during said processing the software transaction is not also one of the plurality of shared memory locations to be written during said processing the software transaction.

5. The method of claim 1, further comprising:
    in response to determining that said attempting to commit the software transaction failed:
        obtaining a new current value of the version clock; and
        verifying that each one of the plurality of shared memory locations to be read during said processing the software transaction has not been modified since said obtaining the new current value of the version clock.

6. The method of claim 1, wherein said determining that each one of the plurality of memory locations to be written during said processing the software transaction is known in advance of said processing the software transaction is based on a previous failed attempt to execute the software transaction.

7. The method of claim 6, wherein said locking each one of the plurality of shared memory locations that is to be written during said processing the software transaction comprises reusing locks acquired during the previous failed attempt to execute the software transaction.

8. The method of claim 1, wherein said obtaining the current value of the version clock comprises incrementing a value of the version clock and taking the incremented value of the version clock as the current of the version clock.

9. The method of claim 1, wherein said updating the respective version value associated with the shared memory location storing the updated value is performed as part of releasing locks acquired during said locking.

10. The method of claim 9, wherein said updating the respective version value associated with the shared memory location storing the updated value and said releasing the locks acquired during said locking are both performed using a single store operation to corresponding different bits of a single memory location.

11. A device, comprising:
a processor; and
a memory coupled to the processor, wherein the memory comprises program instructions executable by the processor to:
determine that:
at least one of a plurality of shared memory locations to be read during processing a software transaction is not known in advance of said processing; and
each one of the plurality of shared memory locations to be written during said processing the software transaction is known in advance of said processing;
wherein each of the plurality of shared memory locations is associated with a respective version value that is updated, based on a value of a version clock shared by the plurality of shared memory locations, when the shared memory location is modified;
in response to said determining:
obtain a current value of the version clock; and
lock each one of the plurality of shared memory locations that is to be written during said processing the software transaction; and
in response to said obtaining and said locking:
perform said processing the transaction to discover which of the plurality of shared memory locations is to be read during said processing the software transaction;
verifying that each one of the plurality of shared memory locations to be read during said processing the software transaction has not been modified since said obtaining; and
in response to said verifying attempt to commit the software transaction, wherein said attempting comprises updating both:
the values stored in each of the plurality of shared memory locations to be written during said processing software transaction; and
the respective version value associated with the shared memory location storing the updated value.

12. The device of claim 11, wherein in said verifying comprises determining that, for each of the plurality of shared memory locations to be read during said processing the software transaction, a corresponding current version value associated with the shared memory location is not greater than the value of the version clock that was current during said obtaining the current value of the version clock.

13. The device of claim 11, wherein the program instructions are further executable to:
in response to determining that said attempting to commit the software transaction failed:
obtain a new current value of the version clock; and
verify that each one of the plurality of shared memory locations to be read during said processing the software transaction has not been modified since said obtaining the new current value of the version clock.

14. The device of claim 11, wherein said determining that each one of the plurality of memory locations to be written during said processing the software transaction is known in advance of said processing the software transaction is based on a previous failed attempt to execute the software transaction.

15. The device of claim 11, wherein said locking each one of the plurality of shared memory locations that is to be written during said processing the software transaction comprises reusing locks acquired during the previous failed attempt to execute the software transaction.

16. The device of claim 11, wherein said obtaining the current value of the version clock comprises incrementing a value of the version clock and taking the incremented value of the version clock as the current value of the version clock.

17. The device of claim 11, wherein said updating the respective version value associated with the shared memory location storing the updated value is performed as part of releasing locks acquired during said locking.

18. A computer-readable storage medium, comprising program instructions computer-executable to implement:
determining that:
at least one of a plurality of shared memory location to be read during processing a software transaction is not known in advance of said processing: and
each one of the plurality of shared memory locations to be written during said processing the software transaction is known in advance of said processing;
wherein each of the plurality of shared memory locations is associated with a respective version value that is updated, based on a value of a version clock shared by the plurality of shared memory locations, when the shared memory location is modified;
in response to said determining:
obtaining a current value of the version clock; and
locking each of the plurality of shared memory locations that is to be written during said processing the software transaction; and
in response to said obtaining and said locking:
performing said processing the transaction to discover which of the plurality of shared memory locations is to be read during said processing the software transaction;
verifying that each one of the plurality of shared memory locations to be read during said processing the software transaction has not been modified since said obtaining; and
in response to said verifying, attempting to commit the software transaction, wherein said attempting comprises updating both:
the value stored in each of the plurality of shared memory locations to be written during said processing the software transaction; and
the respective version value associated with the shared memory location storing the updated value.

* * * * *